(12) United States Patent
Yanzer et al.

(10) Patent No.: US 12,426,607 B2
(45) Date of Patent: Sep. 30, 2025

(54) FLAVOR ADDITIVE EMULSION AND METHOD OF MAKING THEREOF

(71) Applicant: OCTOPI Brewing, Waunakee, WI (US)

(72) Inventors: Paul Joseph Yanzer, Madison, WI (US); Isaac Showaki, Madison, WI (US)

(73) Assignee: Octopi Brewing, Waunakee, WI (US)

( * ) Notice: Subject to any disclaimer, the term of this patent is extended or adjusted under 35 U.S.C. 154(b) by 542 days.

(21) Appl. No.: 17/362,241

(22) Filed: Jun. 29, 2021

(65) Prior Publication Data

US 2022/0338498 A1 Oct. 27, 2022

Related U.S. Application Data

(63) Continuation-in-part of application No. 17/237,758, filed on Apr. 22, 2021, now abandoned.

(51) Int. Cl.
*A23D 7/005* (2006.01)
*A23D 7/02* (2006.01)
(Continued)

(52) U.S. Cl.
CPC ............ *A23D 7/0053* (2013.01); *A23D 7/02* (2013.01); *A23D 7/04* (2013.01); *A23J 1/205* (2013.01);
(Continued)

(58) Field of Classification Search
CPC .......... A23D 7/0053; A23D 7/04; A23D 7/02; A23D 7/00–7/06; A23J 3/08; A23J 1/205; C12C 5/026; A23L 9/22; A23L 9/24; A23L 27/66; A23L 27/80; A23L 29/231; A23L 29/25; A23L 29/275; A23L 29/281; A23L 33/19; A23L 35/10; A23V 2200/222;
(Continued)

(56) References Cited

U.S. PATENT DOCUMENTS 5,817,363 A * 10/1998 Bakker ................... A23L 27/60
426/573
7,205,018 B2 4/2007 Sherwood et al.
(Continued)

FOREIGN PATENT DOCUMENTS

WO WO-2010057030 A2 * 5/2010 ............... C12C 1/18

OTHER PUBLICATIONS

Ghasemi, S., Jafari, S. M., Assadpour, E., & Khomeiri, M., Production of Pectin-Whey Protein Nano-Complexes as Carriers of Orange Peel Oil, Carbohydrate Polymers 177, 369-377 (2017).
(Continued)

*Primary Examiner* — Drew E Becker
(74) *Attorney, Agent, or Firm* — Boyle Fredrickson, S.C.

(57) ABSTRACT

An emulsion for adding flavor to a beverage and a method of creating the emulsion. The emulsion includes an oil component and a stabilizing component. The stabilizing component includes a whey protein isolate solution including whey protein isolate. The whey protein isolate solution has a total solids concentration of 0.2% to 8% and a pH of 2.0 to 6.0. The emulsion is a stable solution that prevents undesirable oil layer formation and adds both the intended taste and rich mouthfeel in the beverage that cannot be obtained from extracts or other flavorings.

20 Claims, 5 Drawing Sheets

(51) Int. Cl.
| | |
|---|---|
| *A23D 7/04* | (2006.01) |
| *A23J 1/20* | (2006.01) |
| *A23J 3/08* | (2006.01) |
| *A23L 9/20* | (2016.01) |
| *A23L 27/00* | (2016.01) |
| *A23L 29/231* | (2016.01) |
| *A23L 29/25* | (2016.01) |
| *A23L 29/275* | (2016.01) |
| *A23L 35/00* | (2016.01) |
| *C12C 5/02* | (2006.01) |

(52) U.S. Cl.
CPC . *A23J 3/08* (2013.01); *A23L 9/22* (2016.08); *A23L 9/24* (2016.08); *A23L 27/80* (2016.08); *A23L 29/231* (2016.08); *A23L 29/25* (2016.08); *A23L 29/275* (2016.08); *A23L 35/10* (2016.08); *C12C 5/026* (2013.01); *A23V 2200/222* (2013.01); *A23V 2200/228* (2013.01); *A23V 2200/242* (2013.01); *A23V 2250/5028* (2013.01); *A23V 2250/5072* (2013.01); *A23V 2250/511* (2013.01); *A23V 2250/54252* (2013.01)

(58) Field of Classification Search
CPC ........ A23V 2200/228; A23V 2200/242; A23V 2250/184; A23V 2250/5028; A23V 2250/5072–50724; A23V 2250/511; A23V 2250/54252
See application file for complete search history.

(56) References Cited

U.S. PATENT DOCUMENTS

| | | | | |
|---|---|---|---|---|
| 9,642,884 B1* | 5/2017 | Skuratovich | ......... | A61K 36/185 |
| 10,765,135 B2* | 9/2020 | Lucey | ................ | C07K 14/4717 |
| 2003/0099753 A1* | 5/2003 | Yang | ........................ | A23L 2/02 |
| | | | | 426/599 |
| 2004/0091598 A1* | 5/2004 | Decker | ................ | A23D 7/0053 |
| | | | | 426/602 |
| 2005/0019476 A1* | 1/2005 | Van Bodegom | .......... | A23L 9/24 |
| | | | | 426/602 |
| 2005/0281939 A1* | 12/2005 | Louter | ................. | A23D 7/0053 |
| | | | | 426/633 |
| 2006/0067956 A1* | 3/2006 | Kolodziejczyk | ....... | A21D 13/80 |
| | | | | 424/70.13 |
| 2006/0083844 A1* | 4/2006 | Sherwood | ................. | A23L 2/54 |
| | | | | 426/590 |
| 2007/0104849 A1* | 5/2007 | McClements | ............. | A23L 2/66 |
| | | | | 426/590 |
| 2008/0044543 A1* | 2/2008 | McClements | ........ | A23D 7/0053 |
| | | | | 426/573 |
| 2010/0119682 A1* | 5/2010 | Ye | ............................. | A23J 3/08 |
| | | | | 426/573 |
| 2011/0311682 A1* | 12/2011 | Bacarella | .................... | A61K 31/716 |
| | | | | 426/573 |
| 2013/0004617 A1* | 1/2013 | Zhang | ..................... | A23L 33/15 |
| | | | | 426/541 |
| 2015/0182455 A1* | 7/2015 | Llamas | ................. | C12C 11/003 |
| | | | | 435/161 |
| 2015/0296843 A1* | 10/2015 | Rojeck | ................. | A23D 7/0053 |
| | | | | 426/519 |
| 2016/0158299 A1* | 6/2016 | Bohus | .................... | C12G 3/055 |
| | | | | 424/725 |
| 2017/0105437 A1* | 4/2017 | Gordon | ..................... | A23G 3/52 |
| 2018/0020699 A1* | 1/2018 | Steup | ........................ | A23L 2/52 |
| | | | | 514/456 |
| 2018/0213823 A1* | 8/2018 | Asai | .......................... | A23L 2/00 |
| 2019/0104751 A1* | 4/2019 | Windrix | .................... | A23D 7/02 |
| 2019/0177674 A1* | 6/2019 | Montgomery | ........... | C12G 3/055 |
| 2019/0328879 A1* | 10/2019 | Ramcharran | .......... | C12G 3/055 |
| 2020/0022386 A1* | 1/2020 | Schwarz | ............... | A61K 9/0095 |
| 2020/0170272 A1* | 6/2020 | Bromley | .............. | A23D 7/0056 |
| 2020/0245666 A1* | 8/2020 | Spall | ........................ | A23L 2/52 |
| 2020/0352191 A1* | 11/2020 | Lonsbery | ................ | A23L 29/04 |
| 2022/0008379 A1* | 1/2022 | Elmes | ................ | A61K 47/183 |
| 2022/0117890 A1* | 4/2022 | Holthaus | ................ | A23L 33/115 |
| 2022/0265743 A1* | 8/2022 | Lecht | ........................ | A23J 3/16 |
| 2023/0000120 A1* | 1/2023 | Sahai | ................... | A23D 7/0053 |
| 2024/0306673 A1* | 9/2024 | Bell | ........................... | A23L 2/52 |

OTHER PUBLICATIONS

Klein, M., Aserin, A., Svitov, I., & Garti, N., Enhanced Stabilization of Cloudy Emulsions with Gum Arabic and Whey Protein Isoltae, Colloids and Surfaces B: Biointerfaces 77, 75-81 (2010).

* cited by examiner

FLAVOR ADDITIVE EMULSION AND METHOD OF MAKING THEREOF

CROSS-REFERENCE TO RELATED APPLICATION

The application is a continuation-in-part of and claims priority to now pending U.S. patent application Ser. No. 17/237,758, filed on Apr. 22, 2021, the entire contents of which are hereby expressly incorporated by reference into the present application.

BACKGROUND OF THE INVENTION

1. Field of the Invention

The present invention relates to an emulsion for adding flavor to a beverage and a method of making the emulsion.

2. Discussion of the Related Art

Flavor additives such as coconut cream and nut butters are widely used in the food industry. For example, coconut cream is widely used in the food industry as a vegan and gluten free dairy cream alternative. However, these flavor additives have had a limited use in the beverage industry because of their high fat content, which creates an unstable mixture and often leads to an undesirable oil layer.

As such, the beverage industry has relied on extracts and other flavorings for add flavors such as coconut, peanut butter, and other nut flavors to beverages such as beer. However, extracts result in an unnatural flavor to the beverage. Meanwhile, other prior art flavorings include the addition of large amounts of coconut flakes or nuts to the fermenting beverage. Yet this results in an incredibly time intensive process that increases losses of the beverage volume and greatly increases the required amount and cost of ingredients. Other flavoring creams are either non-stable or contain high levels of high fructose corn syrup.

As such, there is a need in the art for a stable solution of high fat emulsions for high fat content flavor additives, such as coconut cream and nut butter. The emulsions of the present invention are stable enough to add both the intended taste and rich mouthfeel to a beverage that cannot be obtained from extracts or other flavorings. In addition, the emulsions of the present invention result in an increase in yield in the final beverage product and lower costs of ingredients. The inventive method is also less time consuming than those in the prior art.

SUMMARY OF THE INVENTION

The present invention is an emulsion for adding flavor (e.g., coconut and nut butter) to a beverage such as, but not limited to, an alcoholic drink, such as beer, hard cider, or seltzer.

In accordance with an embodiment of the invention, an emulsion for adding flavor to a beverage includes an oil component and a stabilizing component. The stabilizing component includes a whey protein isolate solution having whey protein isolate. The whey protein isolate solution has a total solids concentration of 0.2% to 8% and a pH of 2.0 to 6.0. In other embodiments of the invention, the whey protein isolate solution has a total solids concentration of 1% to 5%. In yet other embodiments, the whey protein isolate solution has a pH of 3.0 to 3.5.

According to another aspect of the invention, the stabilizing component may include a gum arabica solution in addition to the whey protein isolate solution. The whey protein isolate solution and the gum arabica solution being at a ratio between 1:1 to 6:1. The stabilizing component may have a total solids concentration of 1% to 5%.

According to yet another aspect of the invention, the stabilizing component may include a pectin solution in addition to the whey protein isolate solution. The whey protein isolate solution and the pectin solution being at a ratio between 1:1 to 6:1. The stabilizing component may have a total solids concentration of 1% to 5%.

According to another aspect of the invention, the stabilizing component may include a chitosan solution in addition to the whey protein isolate solution. The whey protein isolate solution and the chitosan solution being at a ratio between 1:1 to 6:1. The stabilizing component may have a total solids concentration of 1% to 5%.

According to yet another aspect of the invention, the oil component is one of coconut cream or nut butter. Further, the oil component of the emulsion may have a molecular size of less than 2 microns.

In accordance with another embodiment of the invention, a method of creating an emulsion for adding flavor to a beverage includes preparing a whey protein isolate solution by providing water, adjusting the pH of the water to 2.0 to 6.0, and adding whey protein isolate to the water while stirring. In some embodiments of the invention, the whey protein isolate is added for a 20% whey protein isolate solution. The method further includes providing additional water, adjusting the pH of the additional water to 2.0 to 6.0, adding the whey protein isolate solution to the additional water, and mixing the whey protein isolate solution and the additional water. In certain instances, the whey protein isolate solution is added to the additional water at approximately a 1:9 ratio. Next, the method includes adding a flavor component to create a coarse emulsion. In some instances, the flavor component is added at a 1:1 ratio. In other embodiments of the invention, the flavor component is a coconut cream or a nut butter. The method also preferably includes running the coarse emulsion through a homogenizer at 20,000 to 30,000 psi for a plurality of cycles to create a primary emulsion.

According to yet another aspect of the invention, the method further includes preparing a gum arabica solution by providing water, adjusting the pH of the water to 2.0 to 6.0, and adding gum arabica to the water. In some embodiments of the invention, the gum arabica is added to create a 20% gum arabica solution. Next, the method includes mixing the gum arabica solution and the primary emulsion to create a mixture and then running the mixture through the homogenizer at 20,000 to 50,000 psi for at least one cycle to create a secondary emulsion.

According to another aspect of the invention, the running the coarse emulsion through the homogenizer at 20,000 to 30,000 psi for a plurality of cycles to create the primary emulsion step preferably includes running the coarse emulsion through the homogenizer at 25,000 psi. In addition, the running the coarse emulsion through the homogenizer at 20,000 to 30,000 psi for a plurality of cycles to create a primary emulsion step further includes running the coarse emulsion through the homogenizer for two cycles. Similarly, the running the mixture through the homogenizer at 20,000 to 50,000 psi for at least one cycle to create the secondary emulsion step preferably includes running the mixture through the homogenizer at 35,000 psi.

According to yet another aspect of the invention, the adjusting the pH of the water to 2.0 to 6.0 step includes adjusting the pH of the water to 3.0 to 3.5. Further yet, the adjusting the pH of the water to 2.0 to 6.0 step further includes adding hydrochloric acid to the water.

According to another aspect of the invention, preparing the whey protein isolate solution may also include heating the whey protein isolate solution to a target temperature (i.e., 80° C.) for a period of time to create a gelled whey protein isolate solution.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DESCRIPTION OF PREFERRED EMBODIMENTS

The present invention and the various features and advantageous details thereof are explained more fully with reference to the non-limiting embodiments described in detail in the following description.

The emulsion of the present invention includes a stabilizing component and a flavor component. The flavor component may also be referred to as an oil component, as the flavor of the resultant emulsion is that of high fat and oil content ingredients. The present invention contemplates a variety of stabilizing component variations that may be used in the emulsion.

Variation 1: Whey Protein Isolate (WPI) solution at a concentration of 2% and pH 3.2.

A first stabilizing component variation may be in the form of a whey protein isolate solution having a pH ranging from 2.0 to 6.0. Preferably, the pH of the whey protein isolate solution ranges from 3.0 to 4.0. More preferably, the pH of the whey protein isolate solution is 3.2.

The whey protein isolate solution has a total solids concentration of 0.2% to 8%. Preferably, the total solids concentration of whey protein isolate may range from 1% to 5%. More preferably, the total solids concentration of the whey protein isolate solution may range from 2% to 4%. Even more preferably, the total solids concentration of the whey protein isolate solution is 2%. It is also contemplated that the whey protein isolate solution of the first stabilizing component may be in the form of a gelled whey protein isolate solution.

Variation 2: WPI and Gum Arabica (GA) Solution at a total solids concentration of 3% and a ratio of 4:1 WPI:GA.

A second stabilizing component variation may be in the form of a whey protein isolate solution and gum arabica solution at a ratio ranging from 1:1 to 6:1 of whey protein isolate solution to gum arabica solution. Preferably, the ratio of whey protein isolate solution to gum arabica solution is 4:1.

The whey protein isolate solution and gum arabica solution has a pH ranging from 2.0 to 6.0. Preferably, the pH of the whey protein isolate and gum arabica solution ranges from 3.0 to 4.0. More preferably, the pH of the whey protein isolate and gum arabica solution is 3.2.

The whey protein isolate solution and gum arabica solution has a total solids concentration of 0.2% to 8%. Preferably, the total solids concentration of the whey protein isolate solution and the gum arabica solution ranges from 1% to 5%. More preferably, the total solids concentration of the whey protein isolate solution and gum arabica solution may range from 2% to 4%. Even more preferably, the total solids concentration of the whey protein isolate solution and gum arabica solution is 3%.

Variation 3: WPI and Pectin Solution at a total solids concentration of 3% and a ratio of 4:1 WPI:Pectin.

A third stabilizing component variation may be in the form of a whey protein isolate solution and pectin solution at a ratio of 1:1 to 6:1 of whey protein isolate solution to pectin solution. Preferably, the ratio of whey protein isolate solution to pectin solution is 4:1.

The whey protein isolate solution and pectin solution has a pH ranging from 2.0 to 6.0. Preferably, the whey protein isolate solution and pectin solution has a pH ranging from 3.0 to 4.0. More preferably, the pH of the whey protein isolate solution and pectin solution is 3.2.

The whey protein isolate solution and pectin solution has a total solids concentration of 0.2% to 8%. Preferably, the whey protein isolate solution and pectin solution has a total solids concentration of 1% to 5%. More preferably, the whey protein isolate solution and pectin solution has a total solids concentration of 2% to 4%. Even more preferably, the whey protein isolate solution and pectin solution has total solids concentration of 3%.

Variation 4: WPI and Chitosan (Ch) Solution at a total solids concentration of 3% and a ratio of 4:1 WPI:Ch.

A fourth stabilizing component variation may be in the form of a whey protein isolate solution and chitosan solution at a ratio ranging from 1:1 to 6:1. Preferably, the ratio of whey protein isolate solution to chitosan solution is 4:1.

The pH of the whey protein isolate solution and chitosan solution may range from 2.0 to 6.0. Preferably, the pH of the whey protein isolate solution and chitosan solution ranges from 3.0 to 4.0. More preferably, the whey protein isolate solution and chitosan solution has a pH of 3.2.

The whey protein isolate solution and chitosan solution has a total solids concentration of 0.2% to 8%. Preferably, the whey protein isolate solution and the chitosan solution has a total solids concentration of 1% to 5%. More preferably, the whey protein isolate and chitosan solution has a total solids concentration of 2% to 4%. Even more preferably, the total solids concentration of the whey protein isolate and chitosan solution is 3%.

Meanwhile, the flavor component or oil component of the emulsion is contemplated as being a high fat content component such as, but not limited to, coconut cream and various nut butters. It is also contemplated that the oil component may be a medicinal oil such as, but not limited, to CBD oil. In some embodiments of the invention, the oil component of the emulsion has a molecular size of less than 2 microns. In other embodiments, the oil component of the emulsion may have a molecular size of less than 1 micron. In yet other embodiments of the invention, the oil component of the emulsion may have a molecular size of 0.5 micron. In some embodiments of the invention, the ratio of stabilizing component to oil component may be about 0.5:10.

As a result of the above in regards to the stabilizing component and the oil component of the emulsion, the emulsion results in a stable solution that is able to be stored and shipped either refrigerated or at room temperature for a period of time. In one preferred embodiment, the beverage can sit for multiple months without separation and creation of an undesired oil layer on the top of the emulsion. The inventive emulsion creates nanocomplex formations of charged proteins and polysaccharides to encapsulate the oil component resulting in the stability of the emulsion during storage and within the beverage. The emulsion results in a consistent flavor additive emulsion that is able to be shipped to beverage manufacturers without risk of separation and inconsistent results in flavoring when added to a beverage. For example, the emulsion of the present invention is able to add accurate taste and rich mouthfeel to a beer that is not able to be reproduced with an extract or other such flavoring.

Figure 1:
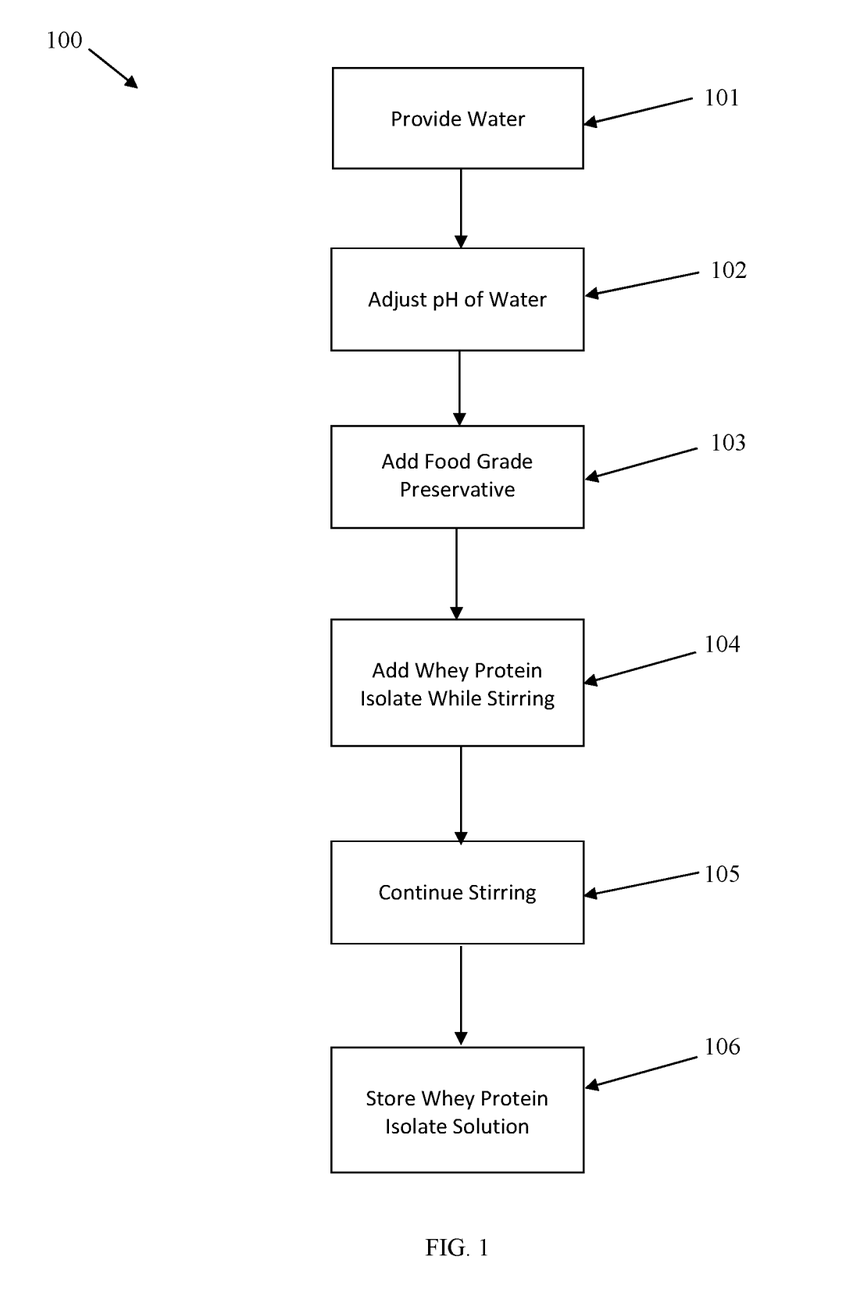
FIG. 1 is a method of making a whey protein isolate solution according to an embodiment of the invention.

FIG. 1 illustrates a method 200 of manufacturing a whey protein isolate solution, according to a non-limiting embodiment of the invention. The measurements listed below regarding the amounts of ingredients included in the whey protein isolate solution are non-limiting and reflective of the ratio of ingredients. That is, the amount of ingredients may be scaled larger or smaller based on the intended amount of whey protein isolate solution created by the method 100.

Method 100 begins with step 101 in which distilled water is weighed (e.g., 1600 grams) into a beaker. In step 102, the pH of the distilled water is then adjusted to a pH ranging from 2.0 to 6.0 using hydrochloric acid (e.g., 0.1 M HCl). Preferably, the pH of the distilled water ranges from 3.0 to 4.0. More preferably, the pH of the distilled water is 3.2. In step 103, a food grade preservative, such as sodium benzoate and/or potassium sorbate (e.g., 0.15% sodium benzoate and 0.15% potassium sorbate) or other food grade preservative, is added to the distilled water. The addition of food grade preservative helps to prevent microbial growth within the solution.

While stirring, preferably with a stir plate, step 104 includes slowly adding whey protein isolate (e.g., 400 grams) to the distilled water to create a whey protein isolate solution of 20%. Other embodiments of the invention contemplate a whey protein isolate solution containing between 10%-30% whey protein isolate. In step 105, the whey protein isolate solution is allowed to stir for a period of time (e.g., 6 hours to fully mix the whey protein isolate within the whey protein isolate solution. In step 106, the whey protein isolate solution is stored in a refrigerator (e.g., overnight at 40° F. to 50° F.) in order to fully hydrate the whey protein isolate within the whey protein isolate solution.

Figure 2:
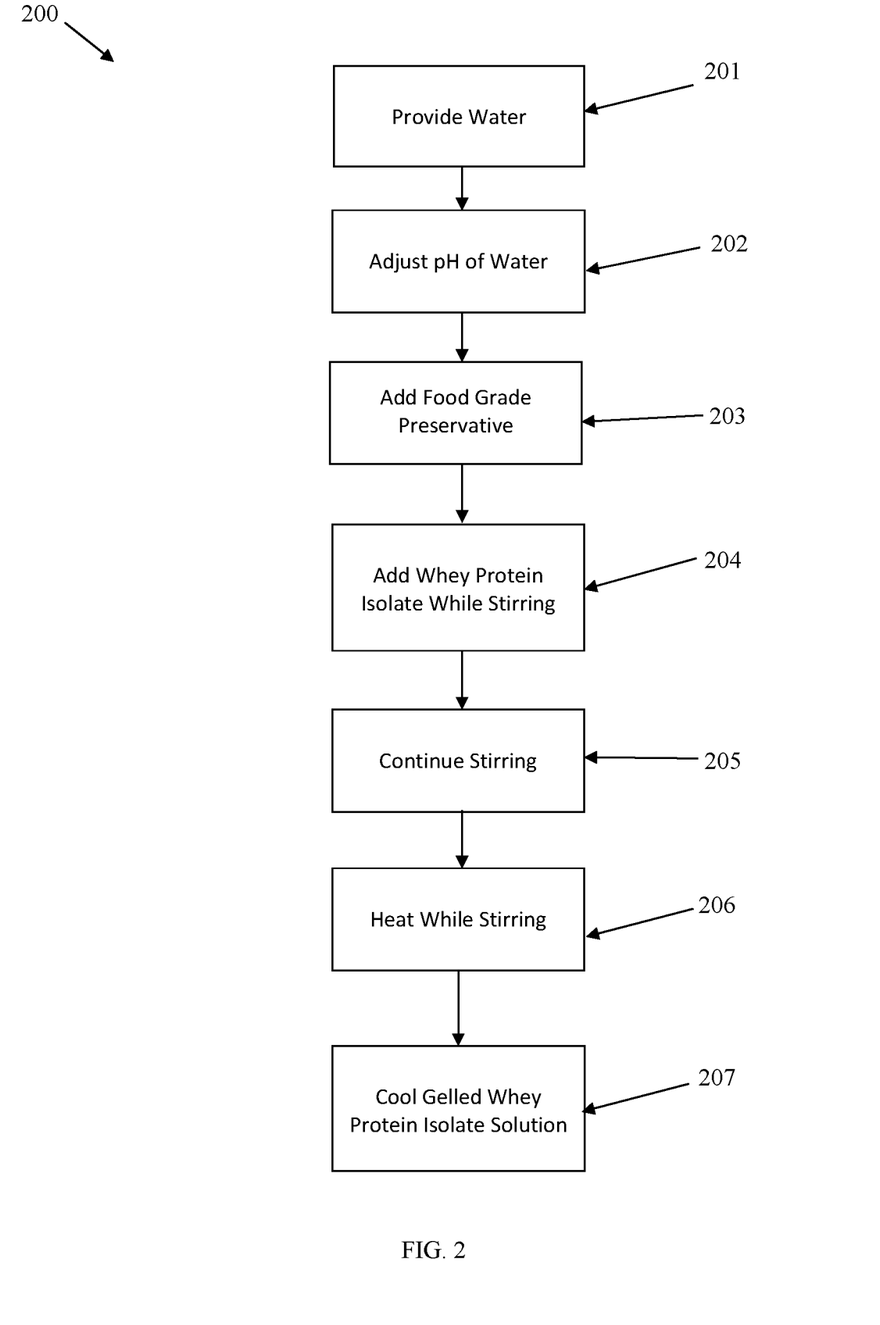
FIG. 2 is a method of making a gelled whey protein isolate solution according to an embodiment of the invention.

Next, FIG. 2 illustrates method 200 of manufacturing a gelled whey protein isolate solution, according to a non-limiting embodiment of the invention. It should be noted that the measurements listed below regarding the amounts of ingredients included in the gelled whey protein isolate solution are non-limiting and reflective of the ratio of ingredients. That is, the amount of ingredients may be scaled larger or smaller based on the intended amount of gelled whey protein isolate solution created by the method 200.

In step 201 of method 200, distilled water is weighed (e.g., 1600 grams) into a beaker. In step 202, the pH of the distilled water is adjusted to a pH ranging from 2.0 to 6.0 using hydrochloric acid (e.g., 0.1 M HCl). Preferably, the pH of the distilled water ranges from 3.0 to 4.0. More preferably, the pH of the distilled water is 3.2. In step 203, a food grade preservative, such as sodium benzoate and/or potassium sorbate (e.g., 0.15% sodium benzoate and 0.15% potassium sorbate) or other food grade preservative, is added to the distilled water. The addition of the food grade preservative helps to prevent microbial growth within the solution.

While stirring, preferably with a stir plate, step 204 includes slowly adding whey protein isolate (e.g., 400 grams) to the distilled water to create a whey protein isolate solution of 20%. Other embodiments of the invention contemplate a whey protein isolate solution containing between 10%-30% whey protein isolate. In step 205, the whey protein isolate solution is allowed to stir for a period of time (e.g., 6 hours to fully mix the whey protein isolate within the whey protein isolate solution.

Next at stop 206, while stirring, the whey protein isolate solution is heated to a target temperature ranging from 70° C. to 90° C. Preferably, the target temperature is 80° C. The whey protein isolate solution is held at the target temperature for a period of time of approximately 30 minutes to turn the whey protein isolate solution into a gelled whey protein isolate solution. In step 107, the gelled whey protein isolate solution is cooled in preparation for use or storage in a refrigerator (e.g., overnight at 40° F. to 50° F.). Once the solution has cooled and is in the form of a gelled whey protein isolate solution, it can be used as a stabilizing component for the inventive method.

Figure 3:
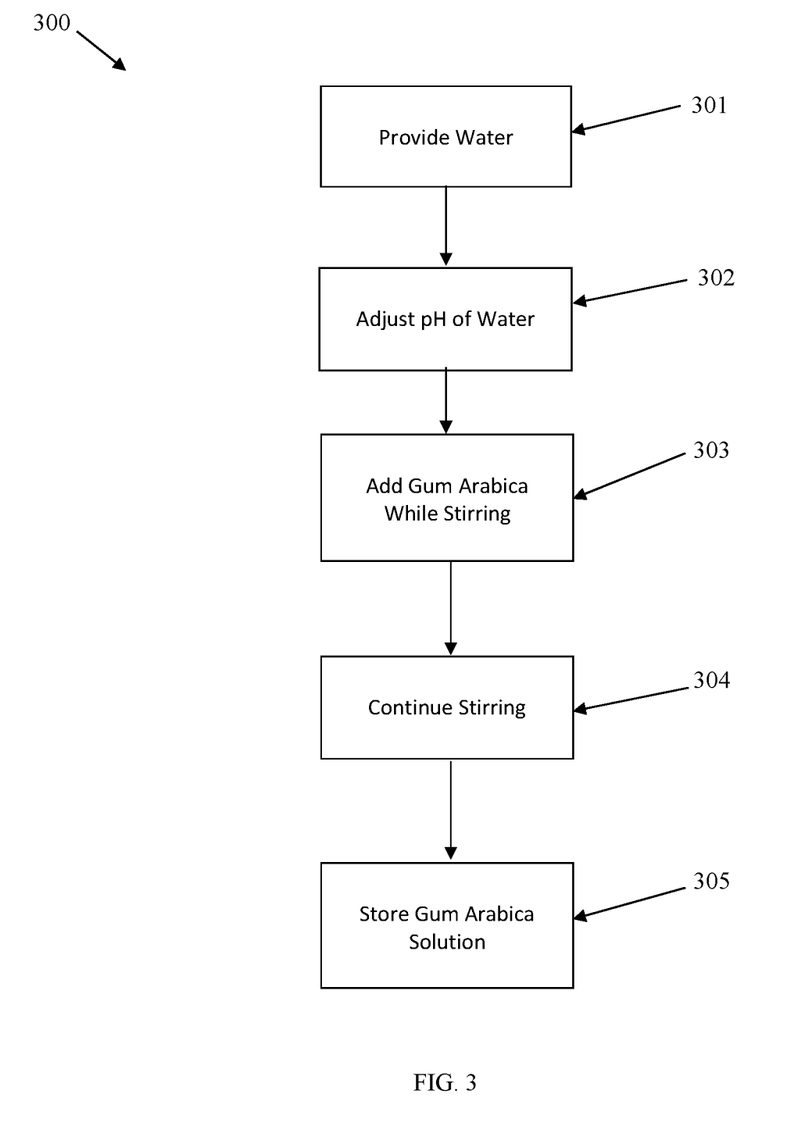
FIG. 3 is a method of making a gum arabica solution according to an embodiment of the invention.

Now referring to FIG. 3, a method 300 of manufacturing a gum arabica solution is shown, according to a non-limiting embodiment of the invention. It should be noted that the measurements listed below regarding the amounts of ingredients included in the gum arabica solution are non-limiting and reflective of the ratio of ingredients. That is, the amount of ingredients may be scaled larger or smaller based on the intended amount of gum arabica solution created by the method 300.

Step 301 of method 300 begins with weighing out distilled water (e.g., 400 grams) into a beaker. In step 302, hydrochloric acid (e.g., 0.1 M HCl) is added to the distilled water to adjust its pH between 2.0 to 6.0. Preferably, the pH of the distilled water ranges from 3.0 to 4.0. More preferably, the pH of the distilled water is adjusted to 3.2.

At step 303, while stirring, preferably with a stir plate, gum arabica (e.g., 100 grams) is slowly added to the distilled water to create a gum arabica solution of 20%. Other embodiments of the invention contemplate a gum arabica solution containing between 10%-30% gum arabica. In step 305, the gum arabica is stirred for a period of time (e.g., several hours) in order to fully dissolve the gum arabica within the gum arabica solution. Step 305 includes storing the gum arabica in a refrigerator (e.g., overnight at 40° F. to 50° F.) to fully hydrate the gum arabica.

Figure 4:
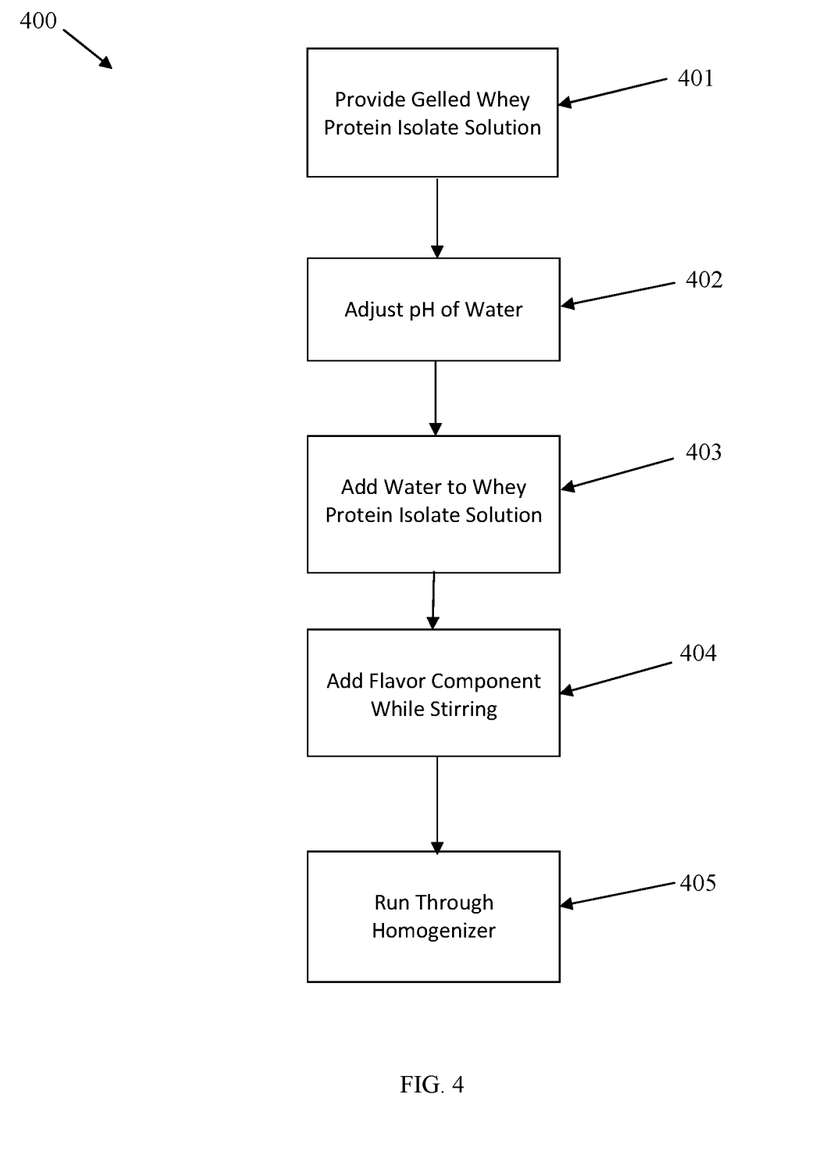
FIG. 4 is a method of making a primary emulsion according to an embodiment of the invention.

Next, FIG. 4 depicts a method 400 of manufacturing a primary emulsion, according to a non-limiting embodiment of the invention. As stated with the previous methods, the measurements listed below regarding the amounts of ingredients including in the primary emulsion are non-limiting and reflective of the ratio of ingredients. That is, the amount of ingredients may be scaled larger or smaller based on the intended amount of primary emulsion created by the method 400.

First, step 401 includes weighing out the whey protein isolate solution (e.g., 1 kg) into a clean and sterile mixing container. Preferably, the whey protein isolate solution of the stabilizing component may be either the whey protein isolate solution described in method 100 or the gelled whey protein isolate solution described in method 200. More preferably, the whey protein isolate solution is the gelled whey protein isolate solution. In step 402, pH of distilled water is adjusted to 2.0 to 6.0. Preferably, the pH of the distilled water ranges from 3.0 to 4.0. More preferably, the pH of the distilled water is adjusted to 3.2. In step 403, the distilled water (e.g., 9 kg) is added to the whey protein isolate solution, preferably, by way of an immersion mixer or homogenizer.

In step 404, taking place during the mixing of step 303, a flavor component (e.g., 10 kg) is added. For example, the flavor component may be a coconut cream or nut butter. The mixing occurs for a period of time (e.g., 5 minutes) and results in a coarse emulsion. In step 405, the coarse emulsion is run through a homogenizer at a pressure ranging from 20,000 psi to 30,000 psi for one or more cycles. Preferably, the coarse emulsion is run through the homogenizer at a pressure of 25,000 psi for at least two cycles. More preferably, the coarse emulsion is run through the homogenizer at a pressure of 25,000 psi for two cycles. The result is the primary emulsion.

Figure 5:
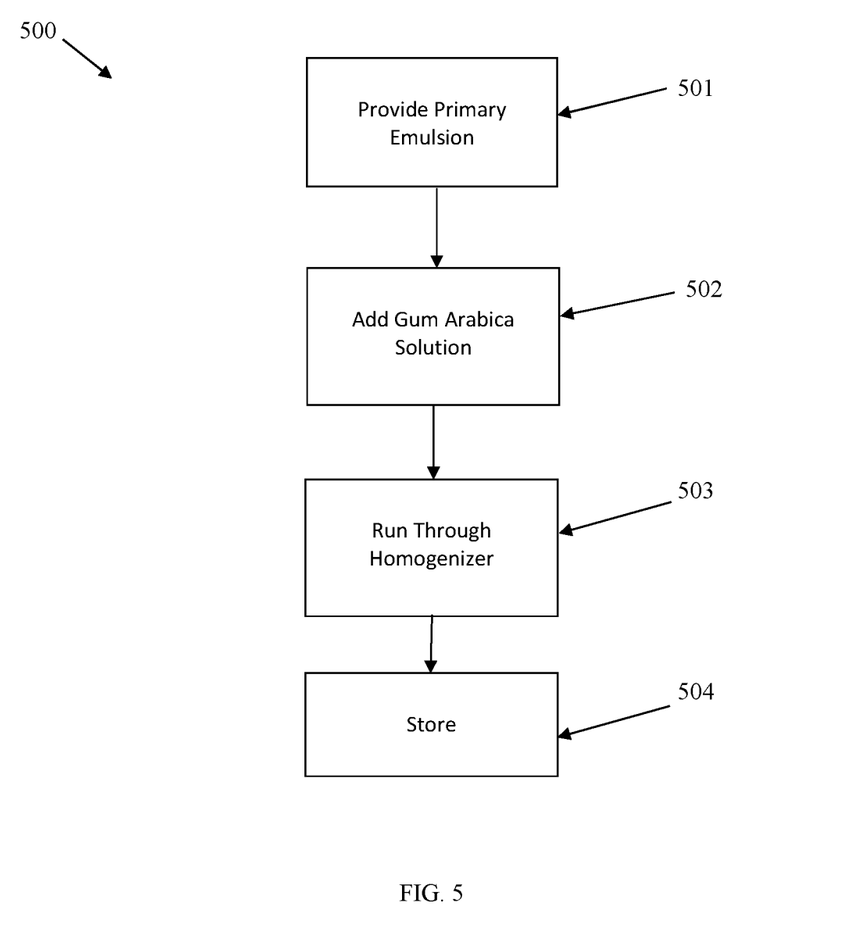
FIG. 5 is a method of making a secondary emulsion according to an embodiment of the invention.

FIG. 5 shows a method 500 of manufacturing a secondary emulsion, according to a non-limiting embodiment of the invention. Step 501 includes providing the above-described primary emulsion. In step 502, the gum arabica solution (e.g., 250 grams) is added to the solution while mixing with an immersion mixer for a period of time (e.g., 5 minutes). It should be noted that the secondary emulsion may include a pectin solution or chitosan solution as opposed to a gum arabica solution. It is also contemplated that the secondary emulsion may contain a combination of these solutions.

In step 503, the resulting mix is put through the homogenizer at a pressure ranging from 20,000 psi to 50,000 psi for one or more cycles. Preferably, the mix is put through the homogenizer at a pressure of 35,000 psi for one or more cycles. More preferably, the mix is put through the homogenizer at a pressure of 35,000 psi for two cycles. The result is a secondary emulsion, which may then be stored in a cool location without exposure to light and is ready to be added to beverages to add coconut flavor and mouthfeel to the final beverage, such as, but not limited to, beer.

1. Preparation of the WPI Stock Solution:

In one preferred embodiment, the inventive septs include the following. Weigh out 1600 grams of distilled water into a 2 liter beaker. Using 0.1 M HCl, bring the pH of the water to 3.2±0.1. Add 0.15% sodium benzoate and 0.15% potassium sorbate to prevent microbial growth. Place the beaker on a stir plate and, under stirring, slowly add 400 grams of whey protein for a 20% WPI solution. Let the solution stir for 6 hours and then store overnight in a refrigerator to fully hydrate the protein.

2. Preparation of the Gelled WPI Solution:

While mixing the WPI solution described above, heat the WPI solution to 80° C. and hold for 30 minutes. Afterwards, cool the resulting gelled WPI solution and either use for the emulsion or store overnight in refrigeration.

3. Preparation of the GA Stock Solution:

Weigh out 400 grams of distilled water into a glass beaker and adjust the pH to 3.2 using 0.1 M HCl. Slowly add in 100 grams of gum arabica to create a 20% GA solution. Stir until fully dissolved and let it sit overnight to fully hydrate the gum.

4. Preparation of Primary Emulsion:

Weigh out 1 kg of WPI solution into a clean, sterile container suitable for mixing. Add 9 kg of distilled water adjust to a pH of 3.2 and mix well using an immersion mixer or homogenizer. While mixing this solution, slowly add in 10 kg of coconut cream and continue mixing for 5 minutes. Ensure the solution is at a pH of 3.2 and continue mixing for another 5 minutes. This coarse emulsion will then be run through a high pressure homogenizer at 25,000 psi for 2 cycles creating a primary emulsion.

5. Preparation of Secondary Emulsion:

To the primary emulsion, add in 250 grams of GA solution while mixing with the immersion mixer. Ensure the solution is at a pH of 3.2. After 5 minutes of mixing, this mix is put through the high pressure homogenizer at 35,000 psi for at least 2 cycles. The resulting emulsion is stored in a cool, but not freezing, location without exposure to light. It is ready to be added to beverages to add coconut flavor and mouthfeel to the final product.

It is specifically intended that the present invention not be limited to the embodiments and illustrations contained herein, but includes modified forms of those embodiments including portions of the embodiments and combinations of elements of different embodiments as come within the scope of the following claims.

What is claimed is:

1. A beverage including an emulsion for adding flavor to the beverage, the emulsion comprising:
   (A) an oil component, the oil component consisting of CBD oil; and
   (B) a stabilizing component, the stabilizing component comprising
   (i) a gelled whey protein isolate solution having a pH of 3.2 and including from 10 wt % to 30 wt % gelled whey protein isolate based on the total weight of the gelled whey protein isolate solution,
   (ii) a second solution comprising from 10 wt % to 30 wt % of a member selected from the group consisting of gum arabica, pectin, chitosan, and combinations thereof, based on the total weight of the second solution,
   the gelled whey protein isolate solution and the second solution being at a ratio from 1:1 to 6:1,
   the stabilizing component having a total solids concentration from 0.2% to 8%;
   the emulsion having a pH from 2.0 to 6.0; and
   the beverage is an alcoholic drink and the emulsion is present in the alcoholic drink.

2. The beverage of claim 1 wherein the emulsion consists of
   (A) the CBD oil having a particle size of less than 2 microns; and (B) the stabilizing component consisting of the gelled whey protein isolate solution, the gum arabica solution, and an optional food grade preservative selected from the group consisting of sodium benzoate, potassium sorbate, and combinations thereof, the whey protein isolate solution and the gum arabica solution being at a ratio of 1:1 to 6:1, and the stabilizing component has a total solids concentration of 1% to 5%.

3. The beverage of claim 1 wherein the emulsion consists of
   (A) the CBD oil having a particle size of less than 2 microns; and
   (B) the stabilizing component consisting of the gelled whey protein isolate solution, the pectin solution, and an optional food grade preservative selected from the group consisting of sodium benzoate, potassium sorbate, and combinations thereof, the gelled whey protein isolate solution and the pectin solution being at a ratio of 1:1 to 6:1, and the stabilizing component has a total solids concentration of 1% to 5%.

4. The beverage of claim 1 wherein the emulsion consists of
   (A) the CBD oil having a particle size of less than 2 microns; and
   (B) the stabilizing component consisting of the gelled whey protein isolate solution, the chitosan solution, and an optional food grade preservative selected from the group consisting of sodium benzoate, potassium sorbate, and combinations thereof, the gelled whey protein isolate solution and the chitosan solution being at a ratio of 1:1 to 6:1, and the stabilizing component has a total solids concentration of 1% to 5%.

5. The beverage of claim 1 wherein the beverage is selected from the group consisting of beer, hard cider, and seltzer.

6. The beverage of claim 2 wherein the beverage is beer and the emulsion is present in the beer.

7. The beverage of claim 3 wherein the beverage is beer and the emulsion is present in the beer.

8. The beverage of claim 4 wherein the beverage is beer and the emulsion is present in the beer.

9. A beverage including an emulsion for adding flavor to the beverage, the emulsion comprising:
   (A) an oil component, the oil component consisting of coconut cream; and
   (B) a stabilizing component, the stabilizing component comprising
   (i) a gelled whey protein isolate solution having a pH of 3.2 and including from 10 wt % to 30 wt % whey protein isolate based on the total weight of the gelled whey protein isolate solution,
   (ii) a second solution comprising from 10 wt % to 30 wt % of a member selected from the group consisting of gum arabica, pectin, chitosan, and combinations thereof, based on the total weight of the second solution,
   the gelled whey protein isolate solution and the second solution being at a ratio from 1:1 to 6:1,
   the stabilizing component having a total solids concentration from 0.2% to 8%;
   the emulsion having a pH from 2.0 to 6.0; and
   the beverage is an alcoholic drink and the emulsion is present in the alcoholic drink.

10. The beverage of claim 9 wherein the beverage is a beer and the emulsion is present in the beer.

11. The beverage of claim 10 wherein the emulsion consists of
    (A) the coconut cream having a particle size of less than 2 microns; and
    (B) the stabilizing component consisting of the gelled whey protein isolate solution, the gum arabica solution, and an optional food grade preservative selected from the group consisting of sodium benzoate, potassium sorbate, and combinations thereof, the gelled whey protein isolate solution and the gum arabica solution being at a ratio of 1:1 to 6:1, and the stabilizing component has a total solids concentration of 1% to 5%.

12. The beverage of claim 10 wherein the emulsion consists of
    (A) the coconut cream having a particle size of less than 2 microns; and
    (B) the stabilizing component consisting of the gelled whey protein isolate solution, the pectin solution, and an optional food grade preservative selected from the group consisting of sodium benzoate, potassium sorbate, and combinations thereof, the gelled whey protein isolate solution and the pectin solution being at a ratio of 1:1 to 6:1, and the stabilizing component has a total solids concentration of 1% to 5%.

13. The beverage of claim 10 wherein the emulsion consists of
    (A) the coconut cream having a particle size of less than 2 microns; and
    (B) the stabilizing component consisting of the gelled whey protein isolate solution, the chitosan solution, and an optional food grade preservative selected from the group consisting of sodium benzoate, potassium sorbate, and combinations thereof, the gelled whey protein isolate solution and the chitosan solution being at a ratio of 1:1 to 6:1, and the stabilizing component has a total solids concentration of 1% to 5%.

14. A beverage including an emulsion for adding flavor to the beverage, the emulsion comprising:
    (A) an oil component, the oil component consisting of nut butter; and
    (B) a stabilizing component, the stabilizing component comprising
    (i) a gelled whey protein isolate solution having a pH of 3.2 and including from 10 wt % to 30 wt % whey protein isolate based on the total weight of the gelled whey protein isolate solution,
    (ii) a second solution comprising from 10 wt % to 30 wt % of a member selected from the group consisting of gum arabica, pectin, chitosan, and combinations thereof, based on the total weight of the second solution,
    the gelled whey protein isolate solution and the second solution being at a ratio from 1:1 to 6:1,
    the stabilizing component having a total solids concentration from 0.2% to 8%;
    the emulsion having a pH from 2.0 to 6.0; and
    the beverage is an alcoholic drink and the emulsion is present in the alcoholic drink.

15. The beverage of claim 14 wherein the beverage is a beer and the emulsion is present in the beer.

16. The beverage of claim 15 wherein the emulsion consists of
    (A) the nut butter having a particle size of less than 2 microns; and
    (B) the stabilizing component consisting of the gelled whey protein isolate solution, the gum arabica solution, and an optional food grade preservative selected from the group consisting of sodium benzoate, potassium sorbate, and combinations thereof, the gelled whey protein isolate solution and the gum arabica solution being at a ratio of 1:1 to 6:1, and the stabilizing component has a total solids concentration of 1% to 5%.

17. The beverage of claim 15 wherein the emulsion consists of
(A) the nut butter having a particle size of less than 2 microns; and
(B) the stabilizing component consisting of the gelled whey protein isolate solution, the pectin solution, and an optional food grade preservative selected from the group consisting of sodium benzoate, potassium sorbate, and combinations thereof, the gelled whey protein isolate solution and the pectin solution being at a ratio of 1:1 to 6:1, and the stabilizing component has a total solids concentration of 1% to 5%.

18. The beverage of claim 15 wherein the emulsion consists of
(A) the nut butter having a particle size of less than 2 microns; and
(B) the stabilizing component consisting of the gelled whey protein isolate solution, the chitosan solution, and an optional food grade preservative selected from the group consisting of sodium benzoate, potassium sorbate, and combinations thereof, the gelled whey protein isolate solution and the chitosan solution being at a ratio of 1:1 to 6:1, and the stabilizing component has a total solids concentration of 1% to 5%.

19. The beverage of claim 14 wherein the emulsion further comprises at least one of a coconut cream and CBD oil.

20. The beverage of claim 14 wherein the beverage is selected from the group consisting of hard cider, malt beverages, and seltzer.

* * * * *